(12) United States Patent
Ito

(10) Patent No.: US 7,633,484 B2
(45) Date of Patent: Dec. 15, 2009

(54) DISPLAY UNIT

(75) Inventor: Yukihiro Ito, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 555 days.

(21) Appl. No.: 11/049,462

(22) Filed: Feb. 3, 2005

(65) Prior Publication Data

US 2005/0168450 A1 Aug. 4, 2005

(30) Foreign Application Priority Data

Feb. 3, 2004 (JP) ............... 2004-026326

(51) Int. Cl.
*G09G 3/36* (2006.01)
(52) U.S. Cl. .................................... 345/104
(58) Field of Classification Search ................ 345/173, 345/178, 18.01–18.06, 20.01, 104; 178/18.09, 178/18.01
See application file for complete search history.

(56) References Cited

U.S. PATENT DOCUMENTS 4,476,463 A * 10/1984 Ng et al. ..................... 345/174
5,729,289 A * 3/1998 Etoh ...................... 348/333.02
2004/0263481 A1* 12/2004 Nishikawa et al. .......... 345/173

FOREIGN PATENT DOCUMENTS

| JP | 2002-341372 A | 11/2002 |
| JP | 2005-164709 A | 6/2005 |
| JP | 2005-242315 A | 9/2005 |
| KR | 97-8515 B1 | 5/1997 |

* cited by examiner

*Primary Examiner*—Richard Hjerpe
*Assistant Examiner*—Shaheda A Abdin
(74) *Attorney, Agent, or Firm*—Sughrue Mion, PLLC

(57) ABSTRACT

A display unit includes a display panel having a display screen on which images are displayed, and (b) a touch panel covering the display screen therewith and detecting a touch thereto made by a user. The touch panel detects the touch in accordance with touch-panel drive signals input thereto. The display panel displays images in accordance with display-drive signals input thereto. The touch panel is switched between a first condition in which the touch-panel drive signals are input into the touch panel and a second condition in which the touch panel is electrically open.

19 Claims, 13 Drawing Sheets

DISPLAY UNIT

BACKGROUND OF THE INVENTION

1. Field of the Invention

The invention relates to a display unit and an electronic device including the display unit.

2. Description of the Related Art

There have been suggested various display units including a display panel displaying images in accordance with received display-drive signals.

In such display units, a display panel is often covered at display screen thereof, that is, a surface thereof facing a user with an electrically conductive cover panel such as a touch panel.

As an example of such display panels, a conventional liquid crystal display device including a display panel covered with a touch panel is illustrated in FIG. 1.

As illustrated in FIG. 1, a conventional liquid crystal display device 100 having a touch panel is comprised of a liquid crystal display panel 110, and a touch panel 120 arranged above a display screen of the liquid crystal display panel 110.

The liquid crystal display panel 110 is comprised of a first substrate 111, a second substrate 112 arranged in parallel with the first substrate 111, a common electrode 113 formed on one of the first and second substrates 111 and 112 (for instance, the second substrate 112), and drain and gate electrodes (not illustrated) both formed on the other substrate. A common-electrode signal (COM) as a signal for driving the liquid crystal display panel 110 is input into the common electrode 113. The common-electrode signal has a high level of 5V and a low level of 0V, and a frequency of 10 kHz.

The touch panel 120 is comprised of a first substrate 121, a second substrate 122 arranged in parallel with the first substrate 121, a first electrically conductive transparent film 123 formed on a surface the first substrate 121 facing the second substrate 122, and a second electrically conductive transparent film 124 formed on a surface the second substrate 122 facing the first substrate 121.

The first and second electrically conductive transparent films 123 and 124 are adhered to each other at margins thereof through a double-sided adhesive 125 such that a certain gap between the first and second electrically conductive transparent films 123 and 124 is maintained.

Touch-panel drive signals XR, XL, YU and YD as signals for driving the touch panel 120 are input into the first and second electrically conductive transparent films 123 and 124. Each of the touch-panel drive signals XR, XL, YU and YD has a high level of 5V and a low level of 0V, and a frequency of 100 kHz.

The touch panel 120 and the liquid crystal display panel 110 are adhered to each other at margins thereof such that a certain gap is maintained therebetween.

The above-mentioned conventional liquid crystal display device 100 is accompanied with unintentional sound.

FIG. 2 is a schematic view of the conventional liquid crystal display device 100, used for explaining the mechanism of generation of unintentional sound, FIG. 3 is a graph showing a relation between voltages of the common electrode 113 and the first and second electrically conductive transparent films 123 and 124, and lapse of time, and FIG. 4 is a graph showing a relation between a direction of an electric field generated between the common electrode 113 and the first and second electrically conductive transparent films 123 and 124, and lapse of time. In FIG. 4, a direction towards the first and second electrically conductive transparent films 123 and 124 from the common electrode 113 is defined as a positive direction.

When a user makes touch with the touch panel 120 to carry out a certain action, the first substrate 121 of the touch panel 120 may make contact with the second substrate 112 of the liquid crystal display panel 110. As a result, when the first substrate 121 of the touch panel 120 leaves the second substrate 112 of the liquid crystal display panel 110, electric charges "e" are accumulated on a surface of the second substrate 112 of the liquid crystal display panel 110 due to a phenomenon called "peeling charge", as illustrated in FIG. 2. In brief, the second substrate 112 of the liquid crystal display panel 110 is charged at a surface thereof because of a touch to the touch panel 120 made by a user.

The common electrode signal COM to be input into the liquid crystal display panel 110 and the touch-panel drive signals XR, XL, YU and YD to be input into the touch panel 120 commonly have a high level of 5V and a low level of 0V, but have frequencies different from each other. That is, the common electrode signal COM and the touch-panel drive signals XR, XL, YU and YD are asynchronous with each other.

Thus, as illustrated in FIG. 3, the first and second electrically conductive transparent films 123 and 124 of the touch panel 120 and the common electrode 113 of the liquid crystal display panel 110 have voltages different from each other. In addition, since a voltage of the first and second electrically conductive transparent films 123 and 124 is sometimes higher and sometimes lower than a voltage of the common electrode 113, as illustrated in FIG. 3, there is generated an electric field directing differently with the lapse of time, between the first and second electrically conductive transparent films 123 and 124, and the common electrode 113, as illustrated in FIG. 4.

Hence, if the liquid crystal display panel 110 is charged at a surface thereof due to the above-mentioned "peeling charge", electrostatic force acts on electric charges "e" in accordance with a direction of the electric field.

Specifically, when the electric field is in a direction towards the first and second electrically conductive transparent films 123 and 124 from the common electrode 113, the electric charges "e" are attracted in the direction, and vice versa.

As a result, the liquid crystal display panel 110 is oscillated in accordance with a direction of the electric field.

Since a frequency at which the liquid crystal display panel 110 oscillates, that is, a cycle at which the electric field changes its direction is dependent on a frequency of the touch-panel drive signal or the common electrode signal, if those signals have a frequency within an audible band, a user would listen to the oscillation of the liquid crystal display panel 110 as "unintentional sound".

FIG. 5 illustrates a conventional liquid crystal display device 200 comprised of a liquid crystal display panel 110, and a protection cover 210 covering a display screen of the liquid crystal display panel 110 therewith as a cover panel.

The above-mentioned "unintentional sound" occurs not only in the liquid crystal display device 100 including the touch panel 120, illustrated in FIG. 1, but also in the liquid crystal display device 200 including the protection cover 210, illustrated in FIG. 5.

This is because when the protection cover 210 having been compressed for some reason makes contact with the liquid crystal display panel 110, the above-mentioned "peeling charge" occurs at a surface of the liquid crystal display panel 110, and electrostatic force acts on the resultant electric charges "e" in accordance with a direction of electric field generated due to the common electrode signals.

For instance, Japanese Patent Application Publication No. 2002-341372 has suggested a solution to the problem caused by the liquid crystal display panel 110 being charged.

Specifically, the Publication suggests a liquid crystal display device comprised of a liquid crystal display panel, and an electrically conductive transparent film formed on a display screen of the liquid crystal display panel, the electrically conductive transparent film being electrically grounded.

However, the suggested liquid crystal display device cannot actually solve the problem of "unintentional sound". To the contrary, "unintentional sound" would be higher in the suggested liquid crystal display device than in other liquid crystal display devices.

SUMMARY OF THE INVENTION

In view of the above-mentioned problems in the conventional display units such as a liquid crystal display device, it is an object of the present invention to provide a display unit and an electronic device including the display unit both of which are capable of preventing occurrence of "unintentional sound" in a unit comprised of a display panel and a cover panel covering a display screen of the display panel therewith.

Hereinbelow are described a display unit and an electronic device in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a display unit including (a) a display panel (2) having a display screen on which images are displayed in accordance with received display-drive signals (COM), and (b) a cover panel (3) covering the display screen therewith, wherein the display-drive signals (COM) are input not only to the display panel (2), but also to the cover panel (3).

For instance, the cover panel (3) may be comprised of a touch panel (3) detecting a touch thereto made by a user.

For instance, the touch panel (3) may detect a touch made by a user, in accordance with touch panel drive signals (XR, XL, YU, YD) input thereto.

For instance, the touch panel (3) may be comprised of (a) a first substrate (7), (b) a second substrate (8) arranged in facing relation to the first substrate (7), (c) a first electrically conductive film (9) formed on a surface of the first substrate (7) facing the second substrate (8), and (d) a second electrically conductive film (11) formed on a surface of the second substrate (8) facing the first substrate (7), wherein the touch panel (3) detects a touch made by a user, in accordance with touch panel drive signals (XR, XL, YU, YD) input to the first and second electrically conductive films (9, 11).

It is preferable that the first and second electrically conductive films (9, 11) are formed entirely over the first and second substrates (7, 8), respectively.

It is preferable that at least one of the first and second electrically conductive films (9, 11) receives the display-drive signals (COM).

The display unit may further include a selector (13, 41) making a first condition in which the selector (13, 41) inputs the display-drive signals (COM) into at least one of the first and second electrically conductive film (11)s in place of the touch panel drive signals (XR, XL, YU, YD), or a second condition in which the selector (13, 41) does not input the display-drive signals (COM) into the first and second electrically conductive films (9, 11).

It is preferable that the selector (13) renders an electrically conductive film into which the display-drive signals (COM) are not input among the first and second electrically conductive films (9, 11), electrically open in the first condition.

It is preferable that the selector (13, 41) detects whether the touch panel (3) is in use or not, and the selector (13, 41) turns the first condition to the second condition when the touch panel (3) is detected to be in use.

It is preferable that the selector (13, 41) turns the second condition to the first condition when the touch panel (3) is detected to be not in use.

The display unit further include a third electrically conductive film (21) formed on the touch panel (3) in electrical isolation from the first and second electrically conductive films (9, 11), the third electrically conductive film (21) being able to receive the display-drive signals (COM).

For instance, the third electrically conductive film (21) may be formed on a surface of the touch panel (3) facing the display panel (2).

For instance, the third electrically conductive film may be formed entirely on the touch panel (3).

It is preferable that the third electrically conductive film (21) is adapted to always receive the display-drive signals (COM).

It is preferable that the cover panel (3) is comprised of a protection cover (31) for protecting the display panel (2).

The display unit may further include an electrically conductive film (9, 11, 21) formed on the cover panel (3), the electrically conductive film (9, 11, 21) being adapted to receive the display-drive signals (COM).

It is preferable that the electrically conductive film (9, 11, 21) is formed on a surface of the cover panel (3, 31) facing the display panel (2).

It is preferable that the electrically conductive film (9, 11, 21) is formed entirely on the cover panel (3, 31).

It is preferable that the electrically conductive film (9, 11, 21) is adapted to always receive the display-drive signals (COM).

For instance, the display panel (2) may be comprised of a first substrate (4), a second substrate (5) arranged in facing relation to the first substrate (4), and drive electrodes (6) formed on the first and second substrates (4, 5), images are displayed in accordance with display-drive signals (COM) input into the drive electrodes (6), and the display-drive signals (COM) to be input into the cover panel (3) is comprised of display-drive signals (COM) to be input into a drive electrode (6) formed on one of the first and second substrates (4, 5).

It is preferable that the display-drive signals (COM) to be input into the cover panel (3) is comprised of display-drive signals (COM) formed on a substrate arranged closer to the cover panel (3) among the first and second substrates (4, 5).

It is preferable that the drive electrode (6) into which the display-drive signal (COM) is input is formed entirely on the first or second substrate (4, 5).

For instance, the display unit is comprised of a liquid crystal display unit.

There is further provided a display unit including (a) a display panel (2) having a display screen on which images are displayed, and (b) a touch panel (3) covering the display screen therewith and detecting a touch thereto made by a user, the touch panel (3) detecting the touch in accordance with touch panel drive signals (XR, XL, YU, YD) input thereto, the display panel (2) displaying images in accordance with display-drive signals (COM) input thereto, the touch panel (3) being switched between a first condition in which the touch panel drive signals (XR, XL, YU, YD) are input into the touch panel (3) and a second condition in which the touch panel (3) is electrically open.

The display unit may further include a selector (41) which switches the first condition to the second condition.

It is preferable that the selector (41) detects whether the touch panel (3) is in use or not, and the selector (41) turns the first condition to the second condition when the touch panel (3) is detected to be not in use.

It is preferable that the selector (41) detects the first condition to the second condition when a predetermined period of time has passed after the touch panel (3) was detected to be not in use.

The display unit may further include a second selector (42) for switching the second condition into the first condition.

In another aspect of the present invention, there is provided an electronic device including the above-mentioned display unit.

For instance, the electronic device is comprised of a mobile communication terminal.

It is preferable that the electronic device is comprised of a mobile phone.

The advantages obtained by the aforementioned present invention will be described hereinbelow.

In the display unit in accordance with the present invention, the display-drive signals are input not only to the display panel, but also to the cover panel. Hence, while the display-drive signals are being input into the cover panel, it would be possible to suppress a voltage difference between the cover panel and the display panel. Accordingly, it is possible to prevent generation of electric field between the display panel and the cover panel, preventing the display and cover panels from being oscillated. As a result, it is possible to prevent generation of "unintentional sound".

In the display unit in accordance with the present invention, the touch panel is adapted to be switched between a first condition in which the touch-panel drive signals are input into the touch panel and a second condition in which the touch panel is electrically open. It would be possible to prevent generation of electric field between the display and touch panels in the second condition, preventing the display and touch panels from being oscillated. As a result, it is possible to prevent generation of "unintentional sound".

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 6:
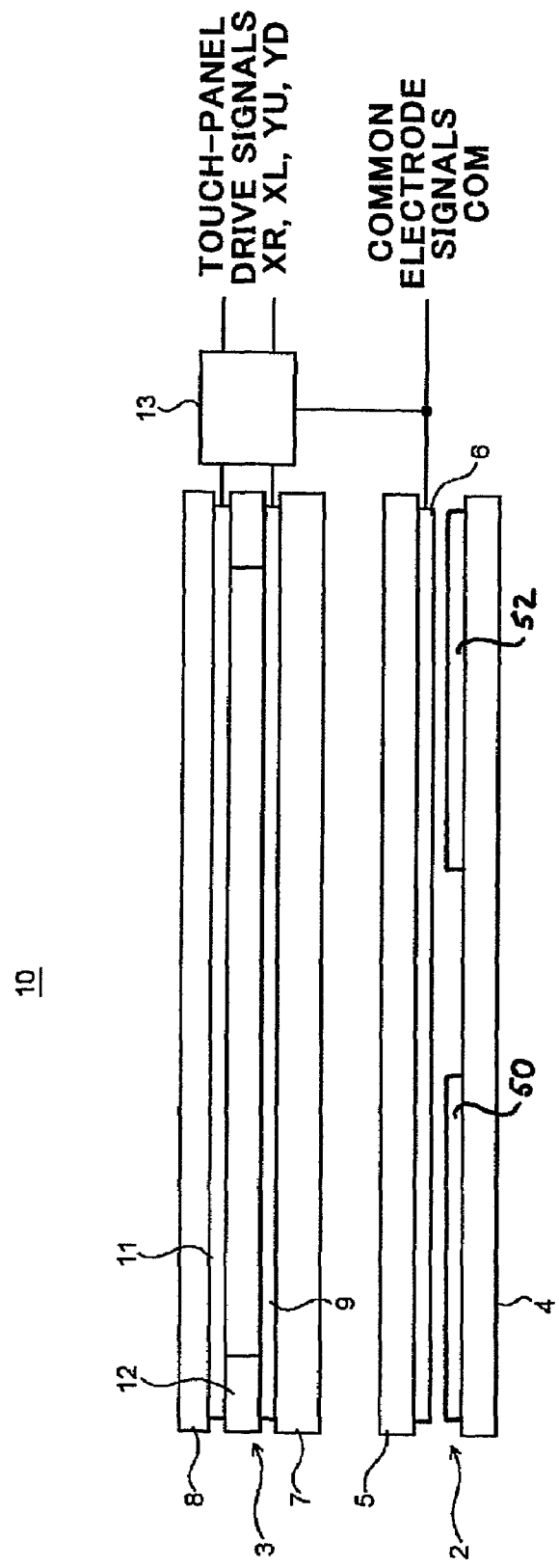
FIG. 6 is a cross-sectional view of a liquid crystal display device in accordance with the first embodiment of the present invention.

As illustrated in FIG. 6, a liquid crystal display device 10 in accordance with the first embodiment is comprised of a liquid crystal display panel 2, and a touch panel 3.

The liquid crystal display panel 2 is comprised of a first substrate 4, a second substrate 5 arranged in parallel with the first substrate 4, a common electrode (or a drive electrode) 6 formed on one of the first and second substrates 4 and 5 (for instance, the second substrate 5 having a display screen thereon), and drain and gate electrodes 50, 52 formed on the other substrate (specifically, the first substrate 4).

The common electrode 6 is formed almost entirely over the second substrate 5, for instance, and extends perpendicularly to the drain and gate electrodes. Specifically, the common electrode 6 and the drain and gate electrodes are arranged in a matrix. The drain and gate electrodes receive drain and gate signals for driving the liquid crystal display panel 2, through a signal input device (not illustrated), and the common electrode 6 receives a common electrode signal COM for driving the liquid crystal display panel 2, through a common-electrode signal input device (not illustrated).

For instance, the common electrode signal COM has a high level of 5V and a low level of 0V, and a frequency of 10 kHz.

The liquid crystal display panel 2 displays images thereon in accordance with the common electrode signals, the drain signals and the gate signals.

The touch panel 3 is of a resistive film type touch panel, and is comprised of a first substrate 7, a second substrate 8 arranged in parallel with the first substrate 7, a first electrically conductive transparent film 9 formed on the first substrate 7, and a second electrically conductive transparent film 11 formed on the second substrate 8.

Specifically, the first electrically conductive transparent film 9 is formed almost entirely on a surface of the first substrate 7 facing the second substrate 8, and the second electrically conductive transparent film 11 is formed almost entirely on a surface of the second substrate 8 facing the first substrate 7. Thus, the first and second electrically conductive transparent films 9 and 11 face each other.

The first and second electrically conductive transparent films 9 and 11 are adhered to each other at marginal areas thereof through a double-sided adhesive tape 12, and are kept spaced away from each other by a fixed gap by the double-sided adhesive tape 12. The gap is in the range of about 0.1 to about 0.2 mm.

The second substrate 8 of the touch panel 3 located closer to a user than the first substrate 7 is composed of flexible material such that the second substrate 8 is elastically deformed when a user makes touch with the touch panel 3, to thereby cause the second electrically conductive transparent film 11 to make contact with the opposed first electrically conductive transparent film 9. When a user stops making touch with the touch panel 3, the second substrate 8 is elastically deformed to its original shape, and resultingly, the first and second electrically conductive transparent films 9 and 11 are spaced away from each other by the above-mentioned gap.

Specifically, the second substrate 8 is composed of synthetic resin such as PET, or glass. The first substrate 7 is composed of synthetic resin such as PET, acryl or polycarbonate, or glass.

The first and second electrically conductive transparent films 9 and 11 receive touch-panel drive signals XR, XL, YU and YD for driving the touch panel 3, through a touch-panel drive signal input device (not illustrated). For instance, the touch-panel drive signals XR, XL, YU and YD have a high level of 5V and a low level of 0V, and a frequency of 100 kHz.

Figure 7:
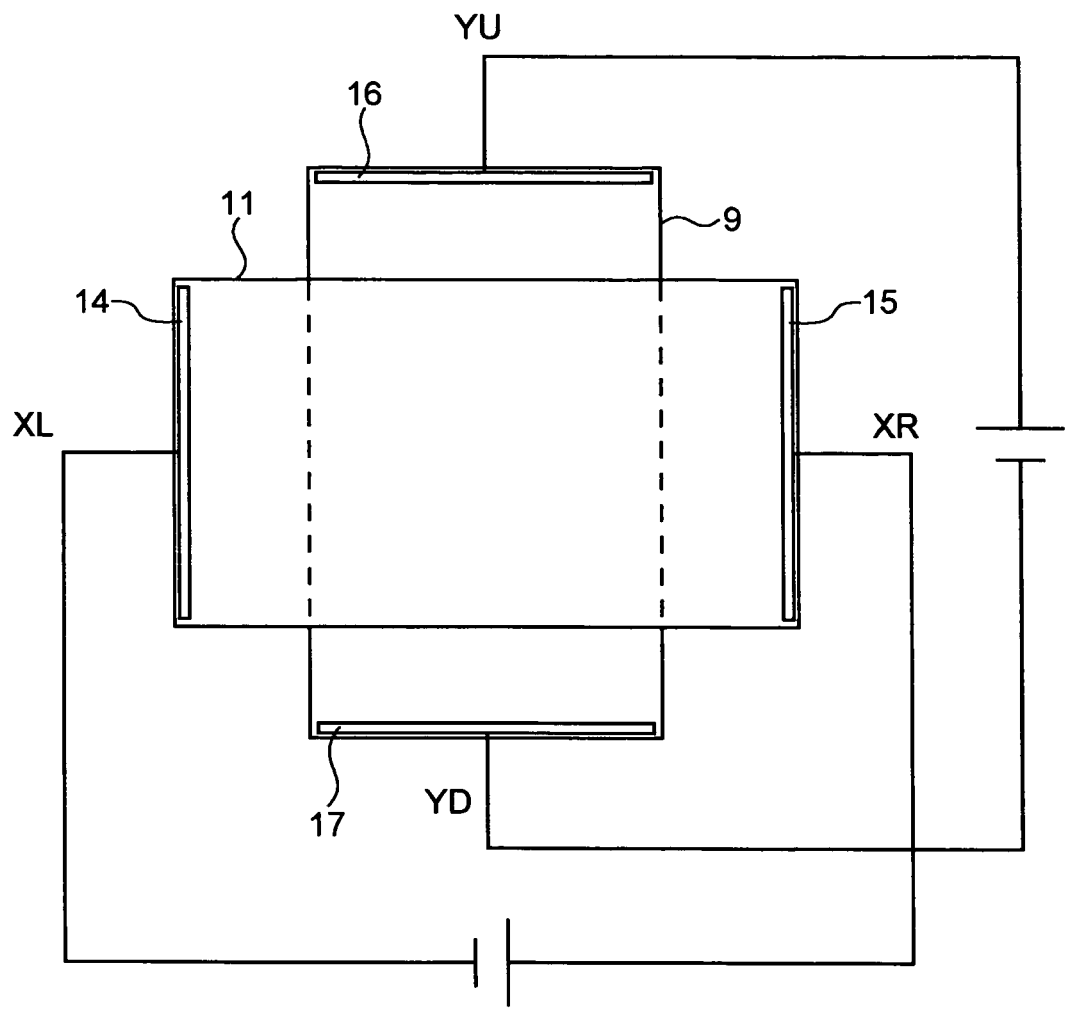
FIG. 7 is a schematic view of a touch panel in the liquid crystal display device illustrated in FIG. 6.

FIG. 7 is a schematic view of the touch panel 3. As illustrated in FIG. 7, electrodes 16 and 17 are formed on opposite ends of the first electrically conductive transparent film 9, and similarly, electrodes 14 and 15 are formed on opposite ends of the second electrically conductive transparent film 11.

The touch-panel drive signals YU and YD are input into the first electrically conductive transparent film 9 through the electrodes 16 and 17, and the touch-panel drive signals XR and XL are input into the second electrically conductive transparent film 11 through the electrodes 14 and 15.

The touch panel 3 detects a touch made by a user, in accordance with the touch-panel drive signals. That is, the touch panel 3 detects a location at which the second electrically conductive transparent film 11 makes contact with the first electrically conductive transparent film 9 because of a touch made by a user, in accordance with the touch-panel drive signals.

The touch panel 3 and the liquid crystal display panel 2 are adhered to each other at marginal areas thereof such that they are spaced away from each other by a certain gap. For instance, the gap is in the range of about 0.2 to about 0.4 mm.

The first and second electrically conductive transparent films 9 and 11 are designed to receive the common electrode signal COM.

That is, the liquid crystal display device 10 includes a selector 13 for rendering the liquid crystal display device 10 in either a second condition in which the touch-panel drive signals XR, XL, YU and YD are input into the first and second electrically conductive transparent films 9 and 11 or a first condition in which the common electrode signal COM is input into the first and second electrically conductive transparent films 9 and 11 in place of the touch-panel drive signals XR, XL, YU and YD.

The common electrode signal COM is input into the first and/or second electrically conductive transparent films 9 and 11 through at least one of the above-mentioned four electrodes 14 to 17.

For simplification, it is assumed hereinbelow that the common electrode signal COM is input only into the first electrically conductive transparent film 9.

The selector 13 is designed to further detect whether the touch panel 3 is in use, that is, whether a user inputs a command into the liquid crystal display device 10 through the touch panel 3. For instance, the selector 13 detects whether the touch panel 3 is in use or not by detecting whether the first and second electrically conductive transparent films 9 and 11 make contact with each other.

When the selector 13 judges that the touch panel 3 is not in use, the selector 13 stops the touch-pane drive signals XR, XL, YU and YD from being input into the first electrically conductive transparent film 9, and instead, the selector 13 allows the common electrode signal COM to be input into the first electrically conductive transparent film 9. In addition, when the selector 13 judges that the touch panel 3 is not in use, the selector 13 renders the second electrically conductive transparent film 11 electrically open to thereby stop the touch-pane drive signals XR, XL, YU and YD from being input into the second electrically conductive transparent film 11.

In contrast, when the selector 13 judges that the touch panel 3 is in use, the selector 13 stops the common electrode signal COM from being input into the first electrically conductive transparent film 9, and allows the touch-pane drive signals XR, XL, YU and YD to be input into the first and second electrically conductive transparent films 9 and 11.

Hereinbelow is explained an operation of the liquid crystal display device 10.

Figure 8:
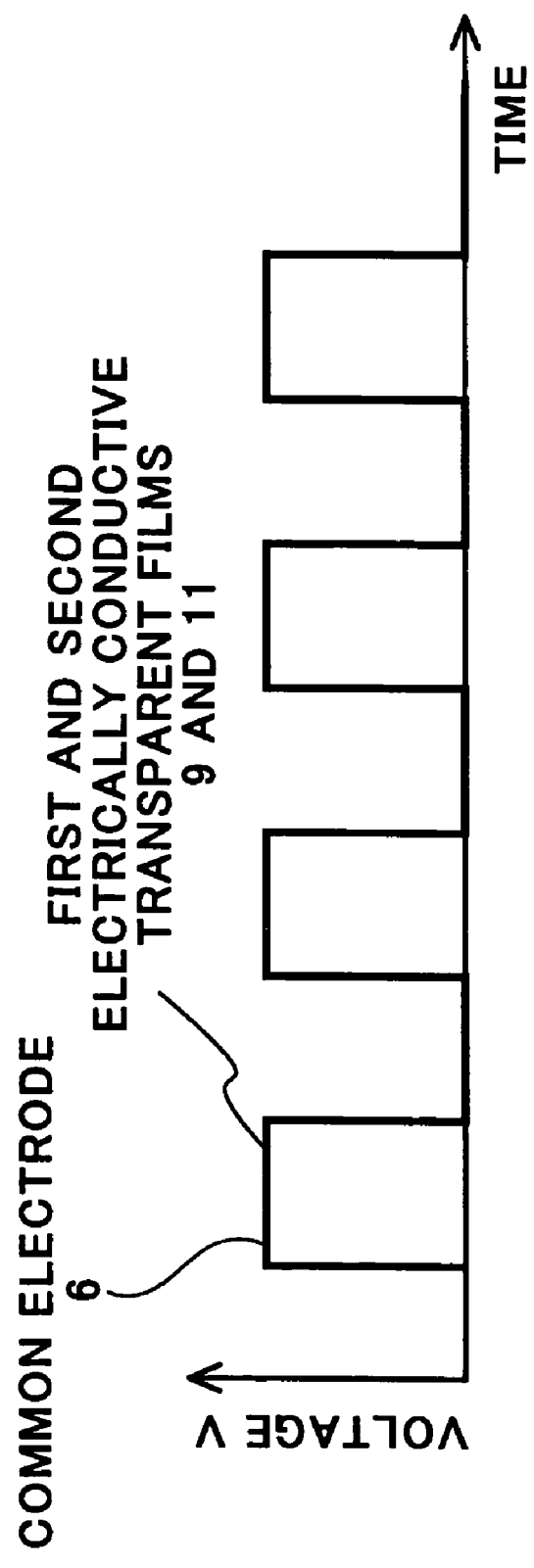
FIG. 8 is a graph showing a relation between voltages of a common electrode and first and second electrically conductive transparent films, and lapse of time in the liquid crystal display device illustrated in FIG. 6.
Figure 9:
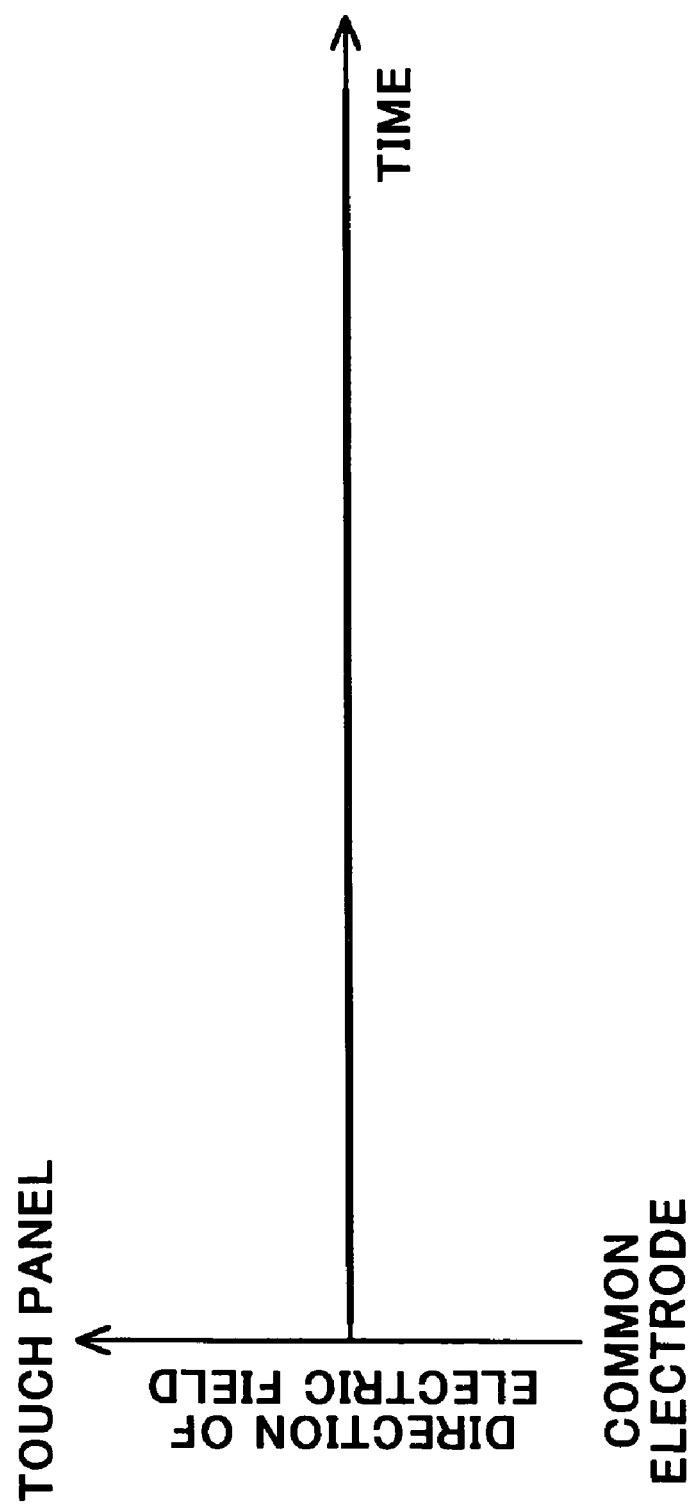
FIG. 9 is a graph showing a relation between a direction of an electric field generated between a common electrode and first and second electrically conductive transparent films, and lapse of time in the liquid crystal display device illustrated in FIG. 6.

FIG. 8 is a graph showing a relation between voltages of the common electrode 6 and the first electrically conductive transparent film 9, and lapse of time while the common electrode signal COM is input into the first electrically conductive transparent film 9 of the touch panel 3, and FIG. 9 is a graph showing a relation between a direction of an electric field generated between the common electrode 6 and first electrically conductive transparent film 9, and lapse of time.

When a user does not handle the touch panel 3, the selector 13 judges that the touch panel 3 is not in use. Hence, the selector 13 inputs the common electrode signal COM into the first electrically conductive transparent film 9 in place of the touch-panel drive signals XR, XL, YU and YD, and renders the second electrically conductive transparent film 11 electrically open.

As illustrated in FIG. 8, when the common electrode signal COM is input into the first electrically conductive transparent film 9, the first electrically conductive transparent film 9 and the common electrode 6 have a common voltage. Hence, there is not generated an electric field between the first electrically conductive transparent film 9 and the common electrode 6, as illustrated in FIG. 9.

Accordingly, even if the liquid crystal display panel 2 is electrically charged at a surface thereof, the electric charges are not influenced by electrostatic force caused by a voltage difference between the first electrically conductive transparent film 9 and the common electrode 6.

Thus, it is possible to prevent the liquid crystal display panel 2 and the touch panel 3 from oscillating, preventing generation of "unintentional sound" caused by the oscillation of the liquid crystal display panel 2 and the touch panel 3.

When a user handles the touch panel 3, the selector 13 judges that the touch panel 3 is in use. Hence, the selector 13 stops the common electrode signal COM from being input into the first electrically conductive transparent film 9, and allows the touch-panel drive signals XR, XL, YU and YD to be input into the first and second electrically conductive transparent films 9 and 11.

Thus, the touch panel 3 is now in a condition for detecting a touch thereto made by a user.

When a user makes touch with the touch panel 3, even if there is generated "unintentional sound", a user would not be nervous about "unintentional sound" unlike while making communication in a phone. Thus, there is caused no problem.

When the touch panel 3 is not handled again, that is, when a user releases his/her finger from the touch panel 3, the selector 13 immediately judges that the touch panel 3 is in no use. Then, the selector 13 inputs the common electrode signal COM into the first electrically conductive transparent film 9 in place of the touch-panel drive signals XR, XL, YU and YD, and renders the second electrically conductive transparent film 11 electrically open.

Hereinbelow are explained the results of the experiment having been carried out by the inventor, with reference to FIG. 10.

Figure 10:
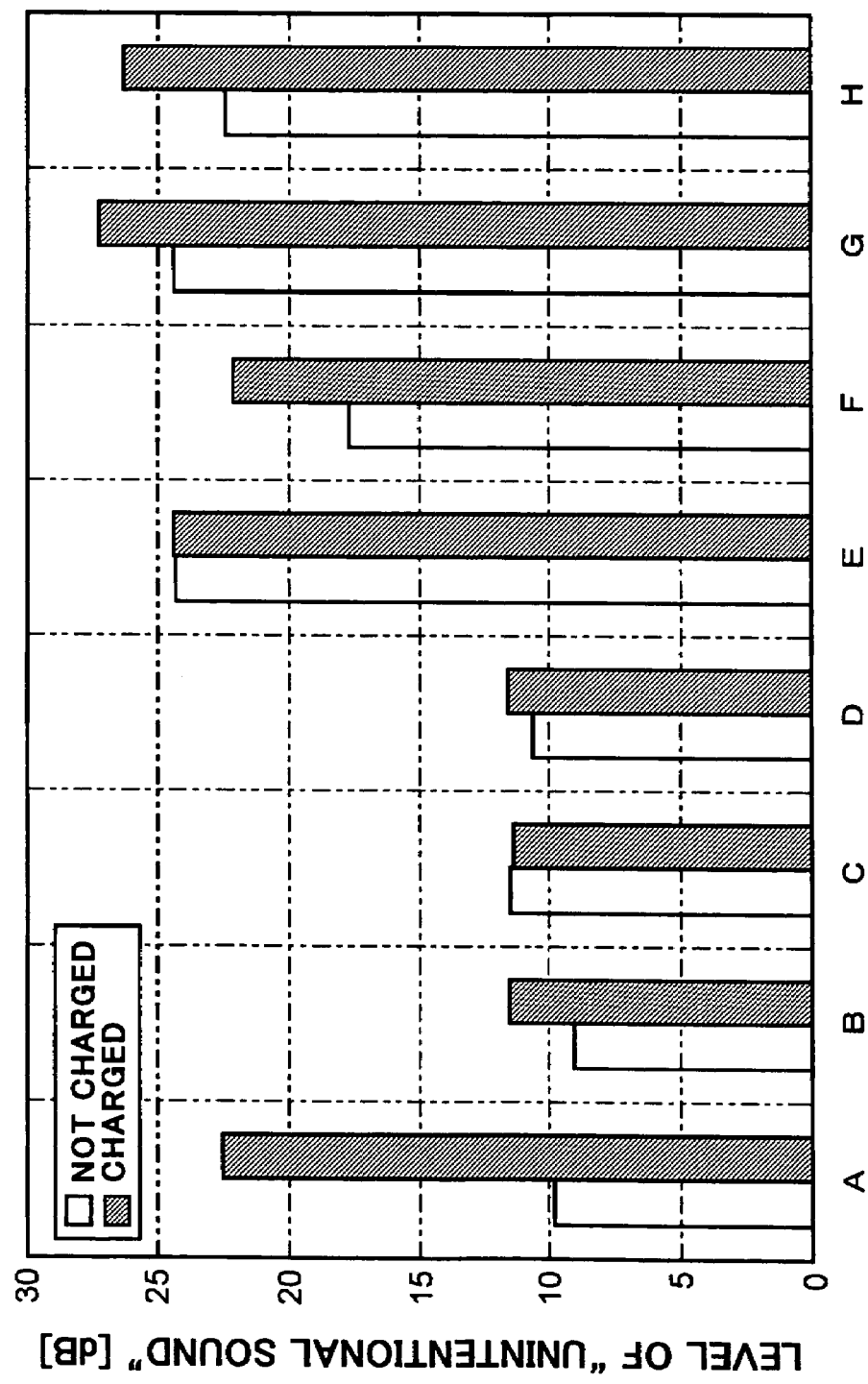
FIG. 10 is a graph showing the experimental data with respect to a level of "unintentional sound".

In data A to H in FIG. 10, "unintentional sound" is expressed with a unit of dB (decibel). In FIG. 10, the non-hatched bars indicate data obtained when the liquid crystal display panel 2 is not electrically charged at a surface thereof, and the hatched bars indicate data obtained when the liquid crystal display panel 2 is electrically charged at a surface thereof.

Figure 1:
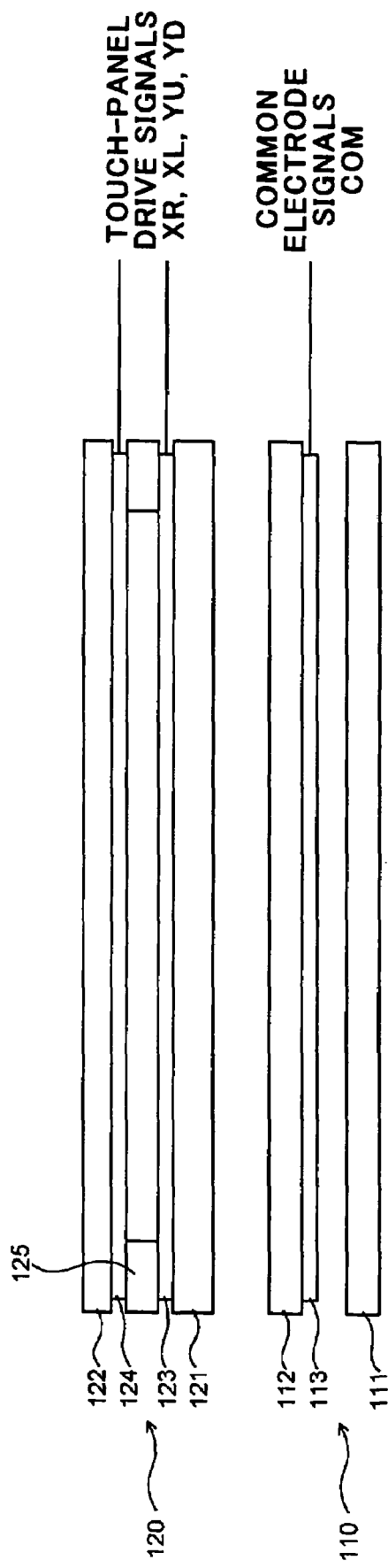
FIG. 1 is a cross-sectional view of a conventional liquid crystal display device including a touch panel.
Figure 2:
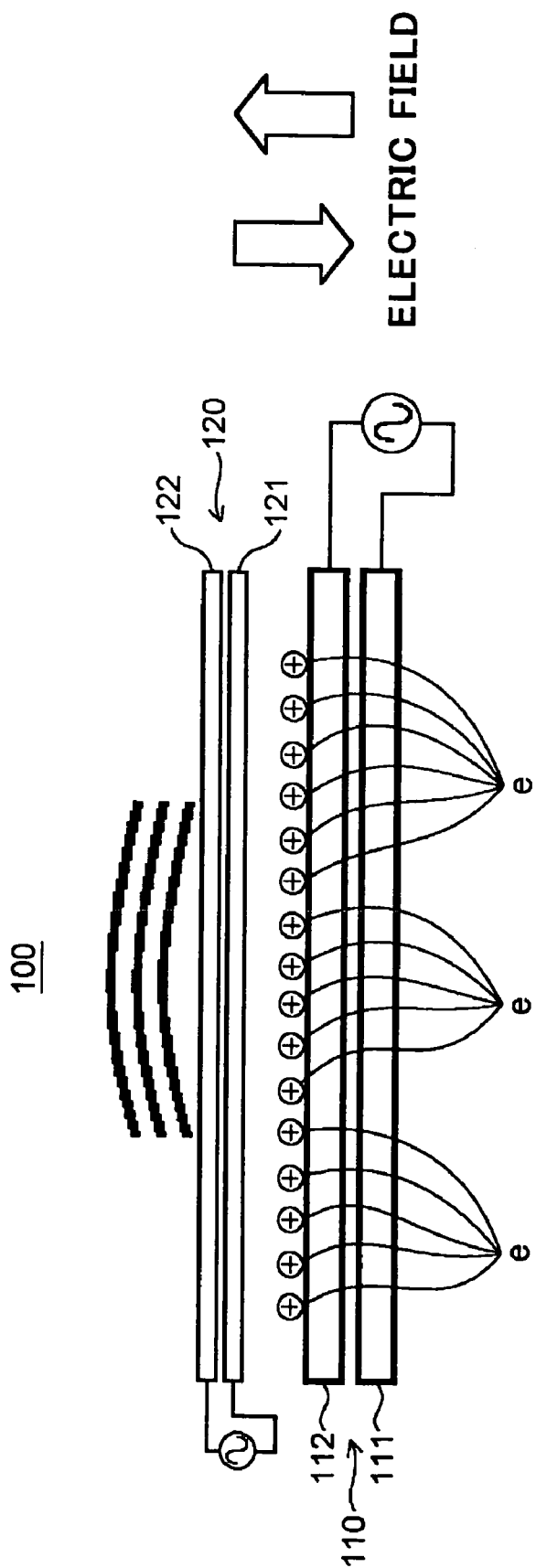
FIG. 2 is a schematic view of the conventional liquid crystal display device illustrated in FIG. 1, used for explaining the mechanism of generation of unintentional sound.
Figure 3:
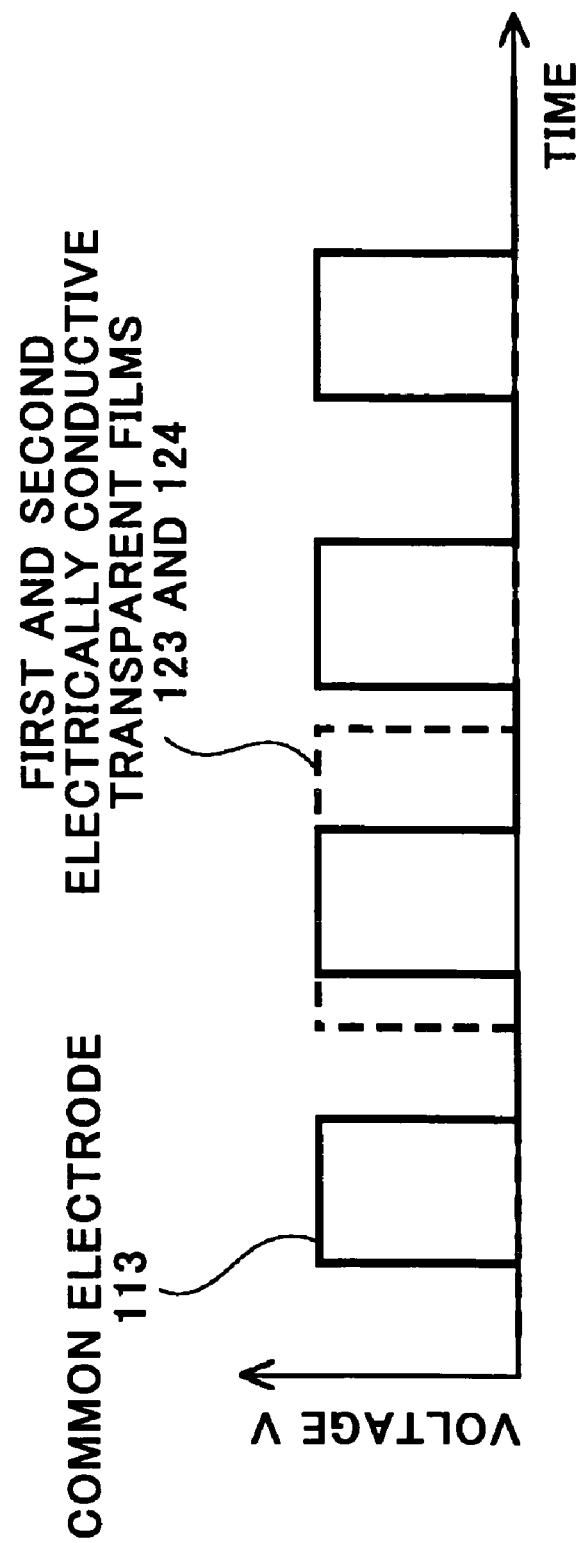
FIG. 3 is a graph showing a relation between voltages of a common electrode and first and second electrically conductive transparent films, and lapse of time, in the conventional liquid crystal display device illustrated in FIG. 1.
Figure 4:
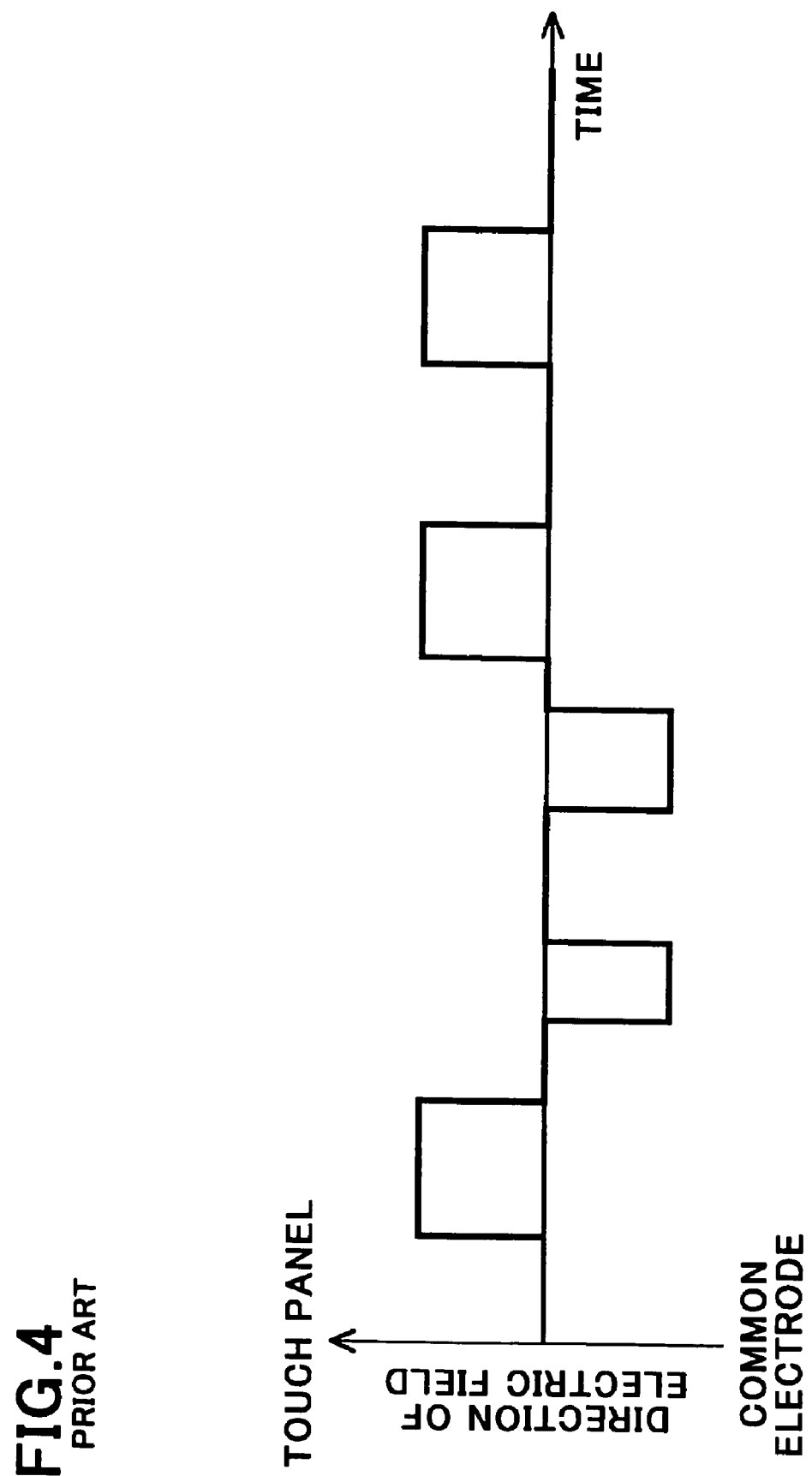
FIG. 4 is a graph showing a relation between a direction of an electric field generated between a common electrode and first and second electrically conductive transparent films, and lapse of time in the conventional liquid crystal display device illustrated in FIG. 1.
Figure 5:
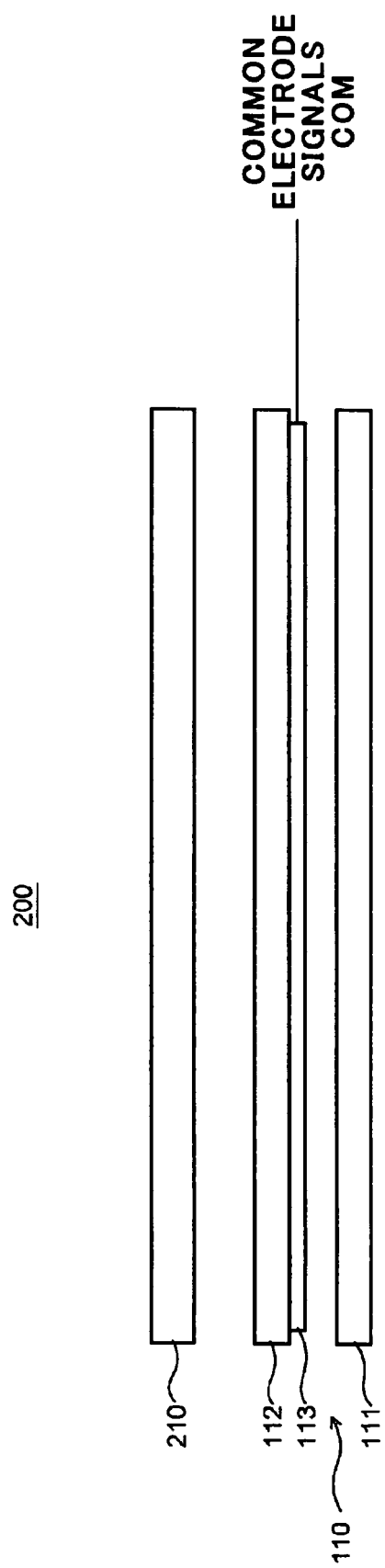
FIG. 5 is a cross-sectional view of another conventional liquid crystal display device including a protection cover.

Data A in FIG. 10 indicates a level of "unintentional sound" in the conventional liquid crystal display device 100 illustrated in FIG. 1.

Each of data C and D in FIG. 10 indicates a level of "unintentional sound" in the liquid crystal display device 10 in accordance with the first embodiment.

Data C indicates a level of "unintentional sound" generated when the common electrode signal COM is input into the first electrically conductive transparent film 9, and the second electrically conductive transparent film 11 is rendered electrically open. Specifically, data C indicates a level of "unintentional sound" generated when the common electrode signal COM is input into one of the electrodes 16 and 17 formed on the first electrically conductive transparent film 9, and the rest of the electrodes 14, 15 and 17 are all rendered electrically open.

In contrast with data C, data D indicates a level of "unintentional sound" generated when the common electrode signal COM is input into the second electrically conductive transparent film 11, and the first electrically conductive transparent film 9 is rendered electrically open. Specifically, data D indicates a level of "unintentional sound" generated when the common electrode signal COM is input into one of the electrodes 14 and 15 formed on the second electrically conductive transparent film 11, and the rest of the electrodes 15, 16 and 17 are all rendered electrically open.

Each of data E and F indicates a level of "unintentional sound" generated when the common electrode signal COM is input into one of the first and second electrically conductive transparent films 9 and 11, and the other is grounded. Specifically, data E indicates a level of "unintentional sound" generated when the common electrode signal COM is input only into the electrode 16 formed on the first electrically conductive transparent film 9, and the rest of the electrodes 14, 15 and 17 are all grounded. Data F indicates a level of "unintentional sound" generated when the common electrode signal COM is input only into the electrode 14 formed on the second electrically conductive transparent film 11, and the rest of the electrodes 15, 16 and 17 are all grounded.

Each of data G and H indicates a level of "unintentional sound" generated when one of the first and second electrically conductive transparent films 9 and 11 is rendered electrically open, and the other is grounded. Specifically, data G indicates a level of "unintentional sound" generated when only the electrode 16 formed on the first electrically conductive transparent film 9 is grounded, and the rest of the electrodes 14, 15 and 17 are all rendered electrically open. Data H indicates a level of "unintentional sound" generated when only the electrode 14 formed on the second electrically conductive transparent film 11 is grounded, and the rest of the electrodes 15, 16 and 17 are all rendered electrically open.

Comparing data A, C and D to H in FIG. 10 with one another, the following can be understood.

In the conventional liquid crystal display device 100 indicated by data A, a level of "unintentional sound" generated when the liquid crystal display panel 2 is electrically charged at a surface thereof was higher than 22 dB.

Each of data E to H shows that there was no improvement or a level of "unintentional sound" became higher than a level of "unintentional sound" generated in the conventional liquid crystal display device 100. That is, it is understood that if one of the first and second electrically conductive transparent films 9 and 11 is grounded, there is no improvement or a level of "unintentional sound" becomes higher than a level of "unintentional sound" generated in the conventional liquid crystal display device 100.

In contrast, the liquid crystal display device 10 in accordance with the first embodiment, indicated by data C and D, was successful in lowering a level of "unintentional sound" to about 12 dB.

A difference in a level of "unintentional sound" between 22 dB observed in the conventional liquid crystal display device 100 and 12 dB observed in the liquid crystal display device 10 in accordance with the first embodiment is quite high to human sense. Specifically, whereas a user can listen to a level of "unintentional sound" indicated by data A, even in normal circumference, a user can listen to a level of "unintentional sound" indicated by data C and D, in quite silent circumference. Thus, the liquid crystal display device 10 in accordance with the first embodiment substantially eliminates "unintentional sound".

As mentioned above, the liquid crystal display device 10 in accordance with the first embodiment makes it possible to lower "unintentional sound" having a level of about 20 to 30 dB in a conventional liquid crystal display device, to about 10 to 15 dB. That is, the liquid crystal display device 10 in accordance with the first embodiment is successful in eliminating "unintentional sound".

In the above-mentioned first embodiment, the common electrode signal COM is input not only into the liquid crystal display panel 2, but also into the touch panel 3. Hence, while the common electrode signals COM are being input into the touch panel 3, it would be possible to suppress a voltage difference between the touch panel 3 and the liquid crystal display panel 2. Accordingly, it is possible to prevent generation of electric field between the liquid crystal display panel 2 and the touch panel 3, preventing the panels 2 and 3 from being oscillated. As a result, it is possible to prevent generation of "unintentional sound".

The liquid crystal display device 10 in accordance with the first embodiment may be applied to an electronic device such as a mobile phone, PDA (personal digital assistant), a video player, or an AV player, for instance.

In the above-mentioned first embodiment, the common electrode signal COM is input into one of the first and second electrically conductive transparent films 9 and 11. However, it should be noted that the common electrode signal COM may be input into both the first and second electrically conductive transparent films 9 and 11 for eliminating "unintentional sound".

Second Embodiment

A liquid crystal display device in accordance with the second embodiment of the present invention is explained hereinbelow with reference to FIG. 11.

In the above-mentioned first embodiment, "unintentional sound" is suppressed by inputting the common electrode signal COM into the first and second electrically conductive transparent films 9 and 11 both of which the touch panel 3 includes as indispensable parts. In the second embodiment explained hereinbelow, the touch panel 3 is designed to additionally include an electrically conductive transparent film into which the common electrode signal COM is input for eliminating "unintentional sound".

Figure 11:
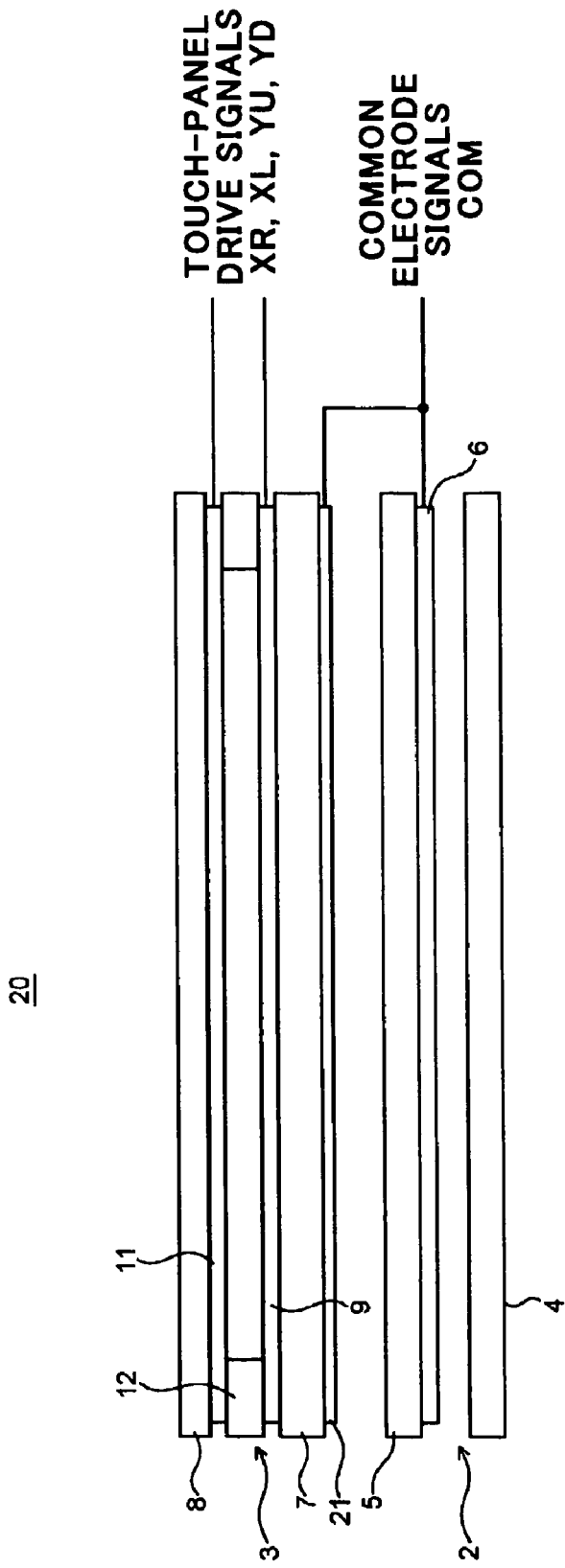
FIG. 11 is a cross-sectional view of a liquid crystal display device in accordance with the second embodiment of the present invention.

The liquid crystal display device 20 in accordance with the second embodiment, illustrated in FIG. 11 is structurally different from the liquid crystal display device 10 in accordance with the first embodiment only in what is explained hereinbelow. Hence, parts or elements that correspond to those of the liquid crystal display device 10 have been provided with the same reference numerals.

As illustrated in FIG. 11, the touch panel 3 is designed to include a third electrically conductive transparent film 21 formed almost entirely on a surface thereof facing the liquid crystal display panel 2.

The third electrically conductive transparent film 21 is designed to always receive the common electrode signal COM. The term "always" means that when the common electrode signal COM is input into the common electrode 6, the third electrically conductive transparent film 21 also receives the common electrode signal COM.

Specifically, the third electrically conductive transparent film 21 has an electrode (not illustrated) formed thereon like the electrodes 14 to 17 formed on the first and second electrically conductive transparent films 9 and 11, and the common electrode signal COM is input into the electrode. It is not necessary for the third electrically conductive transparent film 21 to have a plurality of electrodes unlike the first and second electrically conductive transparent films 9 and 11. Hence, the third electrically conductive transparent film 21 has one electrode.

The liquid crystal display device 20 in accordance with the second embodiment is not necessary to include the selector unlike the liquid crystal display device 10 in accordance with the first embodiment.

The liquid crystal display device 20 in accordance with the second embodiment provides the same advantages as those provided by the liquid crystal display device 10 in accordance with the first embodiment. Though the liquid crystal display device 20 has to additionally include the third electrically conductive transparent film 21, the liquid crystal display device 20 does not need to have the selector 13, ensuring simplification in control of an operation of the liquid crystal display device 20.

The liquid crystal display device 20 in accordance with the second embodiment may be applied to an electronic device such as a mobile phone, PDA (personal digital assistant), a video player, or an AV player, for instance.

Third Embodiment

A liquid crystal display device in accordance with the third embodiment of the present invention is explained hereinbelow with reference to FIG. 12.

In the above-mentioned first and second embodiments, the liquid crystal display devices 10 and 20 are designed to include the touch panel 3 as a cover panel. The liquid crystal display device 30 in accordance with the third embodiment is designed to include a protection cover as a cover panel. The protection cover includes an electrically conductive transparent film into which the common electrode signal COM is input for eliminating "unintentional sound".

Figure 12:
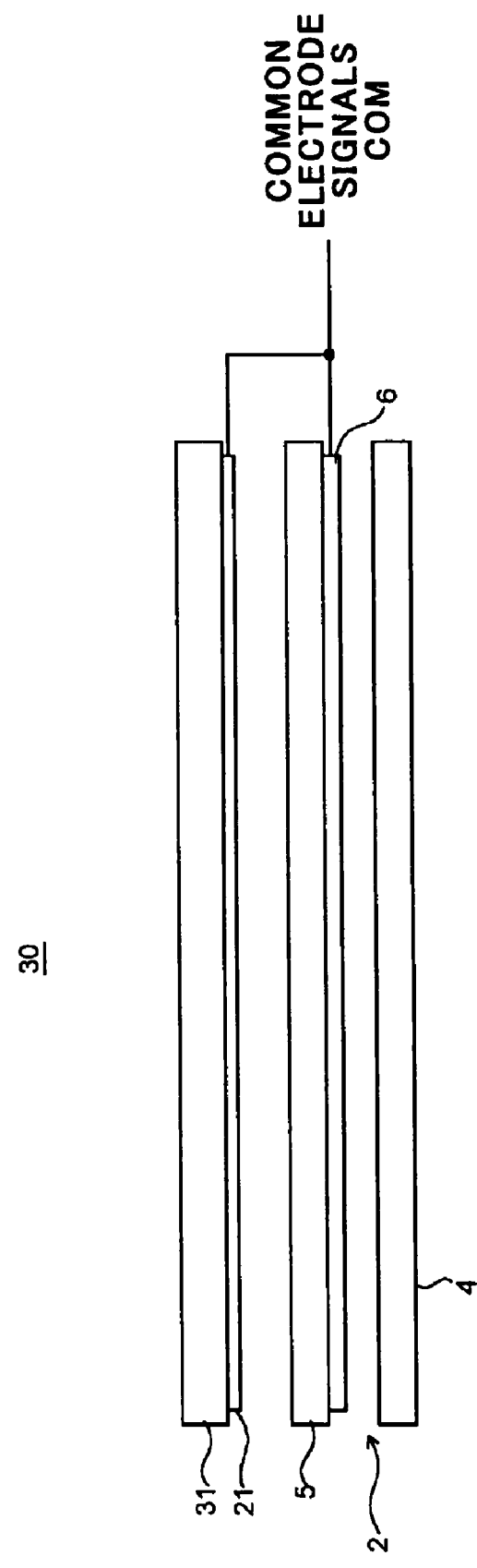
FIG. 12 is a cross-sectional view of a liquid crystal display device in accordance with the third embodiment of the present invention.

The liquid crystal display device 30 in accordance with the third embodiment, illustrated in FIG. 12 is structurally different from the liquid crystal display device 20 in accordance with the second embodiment only in what is explained hereinbelow. Hence, parts or elements that correspond to those of the liquid crystal display device 20 have been provided with the same reference numerals.

In brief, the liquid crystal display device 30 in accordance with the third embodiment is structurally different from the liquid crystal display device 20 in accordance with the second embodiment only in having a protection cover 31 in place of the touch panel 3. The liquid crystal display device 30 in accordance with the third embodiment is identical in structure with the liquid crystal display device 20 in accordance with the second embodiment except the above-mentioned difference.

Specifically, the protection cover 31 is formed almost entirely on a surface thereof facing the liquid crystal display panel 2 with an electrically conductive transparent film 21, into which the common electrode signal COM is always input.

For instance, the protection cover 31 is composed of glass or synthetic resin such as acryl or polycarbonate.

Similarly to the above-mentioned first and second embodiments, the liquid crystal display device 30 in accordance with the third embodiment eliminates "unintentional sound".

The liquid crystal display device 30 in accordance with the third embodiment may be applied to an electronic device such as a mobile phone, PDA (personal digital assistant), an AV player, or a tablet personal computer, for instance.

Fourth Embodiment

A liquid crystal display device in accordance with the fourth embodiment of the present invention is explained hereinbelow with reference to FIG. 13.

In the above-mentioned first and second embodiments, the liquid crystal display devices 10 and 20 eliminate "unintentional sound" by inputting the common electrode signal COM into the touch panel 3. The liquid crystal display device 40 in accordance with the fourth embodiment eliminates "unintentional sound" by rendering a touch panel electrically open.

Figure 13:
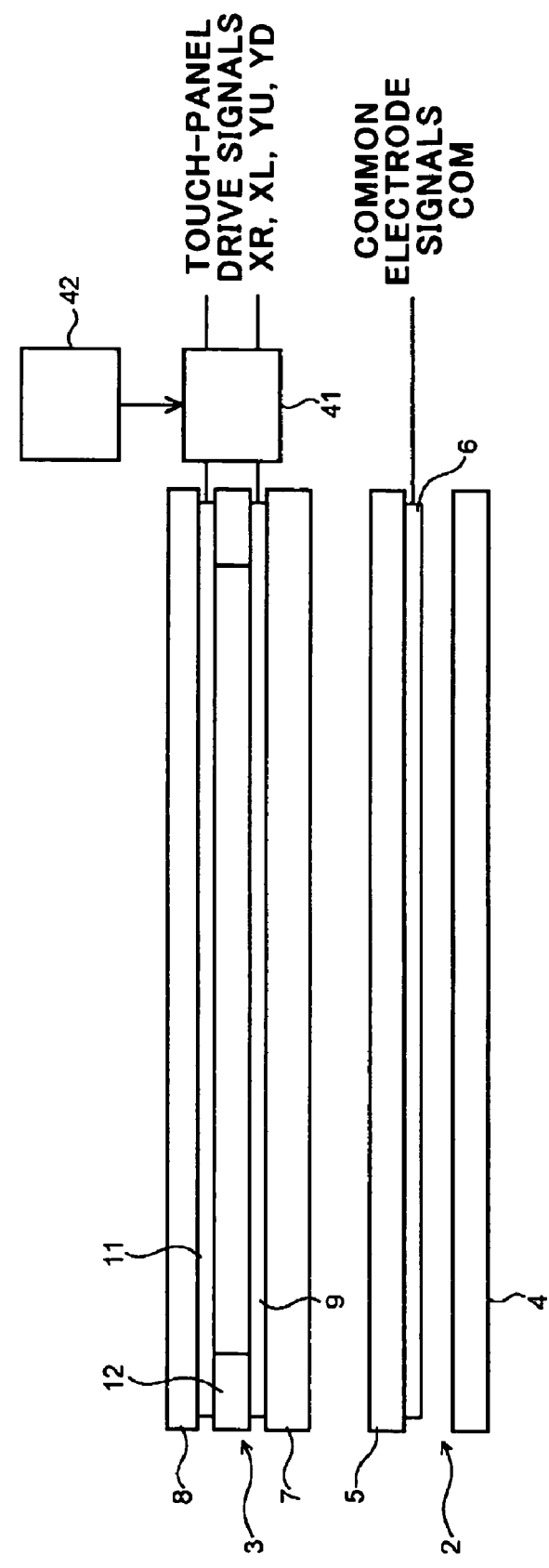
FIG. 13 is a cross-sectional view of a liquid crystal display device in accordance with the fourth embodiment of the present invention.

The liquid crystal display device 40 in accordance with the third embodiment, illustrated in FIG. 13 is structurally different from the liquid crystal display device 10 in accordance with the first embodiment only in what is explained hereinbelow. Hence, parts or elements that correspond to those of the liquid crystal display device 10 have been provided with the same reference numerals.

In the liquid crystal display device 40 in accordance with the third embodiment, the touch panel 3 is designed not to receive the common electrode signal COM.

As illustrated in FIG. 13, the liquid crystal display device 40 includes a selector 41 in place of the selector 13.

The selector 41 puts the touch panel 3 in either a first condition in which the touch-panel drive signals XR, XL, YU and YD are input into the touch panel 3 or a second condition in which the touch panel 3 is electrically open. The selector 41 puts the touch panel 3 into the second condition by rendering all of the electrodes 14 to 17 electrically open.

The selector 41 is designed to detect whether the touch panel 3 is in use, that is, whether a user inputs a command into the liquid crystal display device 40 through the touch panel 3. For instance, the selector 41 detects whether the touch panel 3 is in use or not by detecting whether the first and second electrically conductive transparent films 9 and 11 make contact with each other.

When the selector 41 judges that the touch panel 3 is not in use, the selector 41 renders the electrodes 14 to 17 electrically open. That is, the selector 41 renders the first and second electrically conductive transparent films 9 and 11 electrically open.

For instance, the selector 41 may render the first and second electrically conductive transparent films 9 and 11 electrically open, that is, switches the touch panel 3 into the second condition from the first condition, when a predetermined period of time (for instance, ten seconds) has passed after the detection of the touch panel 3 being in use.

In contrast, when the selector 41 judges that the touch panel 3 is in use, the selector 41 keeps the touch-panel drive signals XR, XL, YU and YD to be input into the first and second electrically conductive transparent films 9 and 11, that is, the selector 41 keeps the touch panel 3 in the first condition.

The liquid crystal display device 40 in accordance with the fourth embodiment is designed to further include a second selector 42 for putting the touch panel 3 into the first condition from the second condition, as illustrated in FIG. 13.

On receipt of a command from a user to put the touch panel 3 into the first condition from the second condition, the second selector 42 transmits an instruction signal to the selector 41 to thereby cause the selector 41 to switch the touch panel 3 into the second condition from the first condition, that is, to allow the touch-panel drive signals XR, XL, YU and YD to be input into the first and second electrically conductive transparent films 9 and 11.

Hereinbelow is explained an operation of the liquid crystal display device 40.

When a user handles the touch panel 3, the selector 41 judges that the touch panel 3 is in use. Hence, the selector 41 keeps the touch panel 3 in the first condition to allow the touch-panel drive signals XR, XL, YU and YD to be input into the first and second electrically conductive transparent films 9 and 11. Thus, the touch panel 3 is kept in a condition for detecting a touch thereto made by a user.

When a user makes touch with the touch panel 3, even if there is generated "unintentional sound", a user would not be nervous about "unintentional sound" unlike while making communication in a phone. Thus, there is caused no problem.

When the touch panel 3 is not handled, that is, when a user releases his/her finger from the touch panel 3, the selector 41 judges that the touch panel 3 is in no use. If the touch panel 3 is kept not handled in a predetermined period of time (for instance, ten seconds), the selector 41 renders the first and second electrically conductive transparent films 9 and 11 electrically open.

Since a voltage difference is not generated between the common electrode 6 and the first and second electrically conductive transparent films 9 and 11, if the first and second electrically conductive transparent films 9 and 11 are electrically open, there is not generated electric field between the common electrode 6 and the first and second electrically conductive transparent films 9 and 11.

Accordingly, even if the liquid crystal display panel 2 is electrically charged at a surface thereof, the electric charges are not influenced by electrostatic force caused by the electric field. Thus, it is possible to prevent the liquid crystal display panel 2 and the touch panel 3 from oscillating, preventing generation of "unintentional sound" caused by the oscillation of the liquid crystal display panel 2 and the touch panel 3.

When a user would like to handle the touch panel 3, a user handles the second selector 42 prior to handling the touch panel 3. The second selector 42 transmits an instruction signal to the selector 41. On receipt of the instruction signal from the second selector 42, the selector 41 switches the touch panel 3 into the first condition from the second condition. Thus, the touch-panel drive signals XR, XL, YU and YD are input again into the first and second electrically conductive transparent films 9 and 11. Now the touch panel 3 is in a condition for detecting a touch made by a user.

Hereinbelow are explained the results of the experiment having been carried out by the inventor, with reference to FIG. 10.

Data B in FIG. 10 indicates a level of "unintentional sound" in the liquid crystal display device 40 in accordance with the fourth embodiment in which the electrodes 14 to 17 are all electrically open.

As shown with data B in FIG. 10, the liquid crystal display device 40 in accordance with the fourth embodiment was successful in lowering a level of "unintentional sound" to about 12 dB.

That is, the liquid crystal display device 40 in accordance with the fourth embodiment substantially eliminates "unintentional sound", similarly to the above-mentioned first embodiment.

In the liquid crystal display device 40 in accordance with the fourth embodiment, the selector 41 switches the touch panel 3 between the first condition in which the touch-panel drive signals XR, XL, YU and YD are input into the touch panel 3 and the second condition in which the touch panel 3 is rendered electrically open. Thus, it is possible to prevent generation of electric field between the liquid crystal display panel 2 and the touch panel 3 when the touch panel 3 is in an electrically open condition, preventing the panels 2 and 3 from being oscillated. As a result, it is possible to prevent generation of "unintentional sound".

Though the present invention is applied to a liquid crystal display device in the above-mentioned first to fourth embodiments, the present invention may be applied to a panel type display unit such as a plasma display unit or an organic electroluminescence display unit.

Though the touch panel 3 in the first, second and fourth embodiments is of a resistive-film type, the touch panel 3 may be designed to be of other types, in which case, one of the first and second electrically conductive transparent films 9 and 11 may be formed on the substrate 7 or 8 in a first direction, and the other may be formed in a second direction perpendicular to the first direction, that is, the first and second electrically conductive transparent films 9 and 11 may be formed to extend perpendicularly to each other.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-026326 filed on Feb. 3, 2004 including specification, claims, drawings and summary is incorporated herein by reference in its entirety.

What is claimed is:

1. A display unit comprising:
    a display panel having a display screen on which images are displayed in accordance with received display-drive signals;
    a cover panel which covers said display screen; and
    a selector coupled between the display panel and the cover panel, which selector selectively electrically connects and disconnects the display panel to and from the cover panel,
    wherein a common electrode signal is input to said display panel and said cover panel when the display panel and the cover panel are electrically connected by the selector.

2. The display unit as set forth in claim 1, wherein said cover panel is comprised of a touch panel to detect a touch made by a user.

3. The display unit as set forth in claim 2, wherein said touch panel detects a touch made by a user, in accordance with touch-panel drive signals input to the cover panel.

4. The display unit as set forth in claim 2, wherein said touch panel comprises:
    a first substrate;
    a second substrate arranged to face said first substrate;
    a first electrically conductive film formed on a surface of said first substrate facing said second substrate; and
    a second electrically conductive film formed on a surface of said second substrate facing said first substrate,
    wherein said touch panel detects the touch made by the user in accordance with touch-panel drive signals input to said first and second electrically conductive films.

5. The display unit as set forth in claim 4, wherein said first and second electrically conductive films are formed entirely over said first and second substrates, respectively.

6. The display unit as set forth in claim 4, wherein at least one of said first or second electrically conductive film receives said display-drive signals.

7. The display unit as set forth in claim 1, further comprising
    an electrically conductive film formed on said cover panel, said electrically conductive film being adapted to receive said display-drive signals.

8. The display unit as set forth in claim 7, wherein said electrically conductive film is formed on a surface of said cover panel facing said display panel.

9. The display unit as set forth in claim 7, wherein said electrically conductive film is formed entirely on said cover panel.

10. The display unit as set forth in claim 7, wherein said electrically conductive film is adapted to always receive said display-drive signals.

11. The display unit as set forth in claim 4, wherein said display panel comprises:
    a first substrate,
    a second substrate arranged to face said first substrate, and
    drive electrodes formed on said first and second substrates, wherein
    the display screen displays the images in accordance with the display-drive signals input into said drive electrodes, and wherein
    said display-drive signals are input into a drive electrode formed on one of said first or second electrically conductive film.

12. The display unit as set forth in claim 11, wherein said display-drive signals are input into the electrode formed on one of the first or second electrically conductive film arranged closer to said cover panel.

13. The display unit as set forth in claim 11, wherein said drive electrode into which said display-drive signal is input is formed entirely on one of said first or second electrically conductive film.

14. The display unit as set forth in claim 1, wherein said display unit is comprised of a liquid crystal display unit.

15. An electronic device including a display unit comprising:
    a display panel having a display screen on which images are displayed in accordance with received display-drive signals;
    a cover panel which covers said display screen; and
    a selector, coupled between the display panel and the cover panel, which selector selectively electrically connects and disconnects the display panel to and from the cover panel,
    wherein a common electrode signal is input to said display panel and to said cover panel when the display panel and the cover panel are electrically connected by the selector.

16. The electronic device as set forth in claim 15, wherein said electronic device is comprised of a mobile communication terminal.

17. The electronic device as set forth in claim 16, wherein said electronic device is comprised of a mobile phone.

18. The display unit as set forth in claim 1, wherein the display panel comprises:
    a common electrode, to which the selector is coupled to supply the display-drive signals.

19. The display unit as set forth in claim 18, wherein the cover panel comprises:
    a first substrate;
    a second substrate arranged to face the first substrate;
    a first electrically conductive film formed on a surface of the first substrate facing the second substrate; and
    a second electrically conductive film formed on a surface of the second substrate facing the first substrate, wherein the selector is selectively couples at least one of the first and second electrically conductive film to the common electrode to supply the same display-drive signals that are being supplied to the common electrode.

* * * * *